United States Patent [19]

Crump, III et al.

[11] Patent Number: 5,515,775
[45] Date of Patent: May 14, 1996

[54] APPARATUS FOR TREATMENT OF SOLID MATERIAL

[75] Inventors: John C. Crump, III, Richmond; Eugene B. Fischer, Chester, both of Va.; Robert C. Wilson, Redmond, Wash.; Warren D. Winterson, Midlothian, Va.; Leif E. B. Jaxmar, Vallakra, Sweden; Gustav M. Norberg, Bjarred, Sweden; Lennart F. Olsson, Nyhamnslage, Sweden

[73] Assignee: Philip Morris Incorporated, New York, N.Y.

[21] Appl. No.: 249,181

[22] Filed: May 25, 1994

Related U.S. Application Data

[62] Division of Ser. No. 969,798, Oct. 30, 1992, Pat. No. 5,335,590.

[51] Int. Cl.⁶ .............................. F24C 15/32; F24D 1/00; A47J 37/00; A21B 1/00
[52] U.S. Cl. .................................... 99/479; 34/75; 34/78; 99/355; 99/443 C; 99/476; 99/477; 126/21 A; 198/778; 131/304; 131/306; 432/133
[58] Field of Search ....................... 99/355, 386, 443 C, 99/476–479; 126/20, 21 A, 21 R; 432/72, 133, 222; 34/10, 12, 13, 75, 78, 83; 198/778; 62/91; 110/248; 131/302–306, 309

[56] References Cited

U.S. PATENT DOCUMENTS

| | | | |
|---|---|---|---|
| 1,491,958 | 4/1924 | Logan et al. | 99/443 C |
| 2,011,247 | 8/1935 | Jourdan | 99/443 C |
| 3,649,306 | 3/1972 | Dalgleish | 99/339 |
| 3,879,857 | 4/1975 | Neville | 34/12 |
| 3,938,651 | 2/1976 | Alfred et al. | 34/147 |
| 4,089,666 | 5/1978 | Knight | 62/91 |
| 4,178,946 | 12/1979 | Knight | 131/135 |
| 4,565,282 | 1/1986 | Olsson et al. | 198/778 |
| 4,582,047 | 4/1986 | Williams | 99/443 C |
| 4,591,333 | 5/1986 | Henke | 126/21 A |
| 4,603,776 | 8/1986 | Olsson | 198/778 |
| 4,612,911 | 9/1986 | Onodera | 99/477 |
| 4,792,303 | 12/1988 | Stewart et al. | 110/248 X |
| 4,899,871 | 2/1990 | Olsson | 198/778 |
| 4,941,567 | 7/1990 | Olsson | 198/778 |
| 5,078,120 | 1/1992 | Hwang | 126/21 A |
| 5,109,758 | 5/1992 | Voegtlin | 99/479 |
| 5,203,256 | 4/1993 | Mueller | 99/476 |

*Primary Examiner*—Timothy F. Simone
*Attorney, Agent, or Firm*—Charles E. B. Glenn; James E. Schardt; Kevin B. Osborne

[57] ABSTRACT

An apparatus is provided that comprises a self-stacking spiral conveyor that traverses through a circulating atmosphere. The atmosphere is manipulated by one or more chambers having an open side adjacent to the perforated sides of the spiral conveyor. Additional control over the circulating atmosphere may be achieved by injection or ejection of gas into one or more chambers.

11 Claims, 10 Drawing Sheets

APPARATUS FOR TREATMENT OF SOLID MATERIAL

This application is a divisional of application U.S. Ser. No. 07/969,798 filed Oct. 30, 1992, U.S. Pat. No. 5,335,590.

BACKGROUND OF THE INVENTION

This invention is an improved machine that can be used to reorder or dry tobacco, or treat other particulate solid materials, e.g., food. The apparatus comprises a self-stacking spiral conveyor that traverses through a circulating atmosphere, which is manipulated by one or more chambers having an open side adjacent to the perforated sides of the spiral conveyor.

The tobacco art has long recognized the desirability of controlling the moisture content of tobacco. Tobacco is processed in a series of steps with each step requiring its own optimal tobacco moisture level in order to produce the highest quality tobacco product. The moisture content of tobacco that has been processed into a useful product is thus typically altered numerous times. The process by which the moisture content of the tobacco is altered can have a lasting effect on the physical, chemical, and subjective characteristics of the final product. The risk of damage to the tobacco while changing the moisture content (e.g., drying or reordering) make control of the process and uniformity of treatment very important. To accomplish product uniformity, a gas to solid treatment apparatus is necessary that treats the tobacco in a uniform manner.

A gas treatment apparatus in the form of a self-stacking spiral conveyor is known where products on the conveyor are treated by heat transfer from a treatment gas, such as refrigerating, freezing, or heating while the products are transported on the conveyor through the treatment gas. The conditioning means for the treatment gas may be a heat exchanger which cools or heats the treatment gas before it circulates around and through the bed of conveyed product.

For example, a Frigoscandia self-stacking spiral conveying machine (e.g., a Model GCP 42 self-stacking spiral freezer supplied by Frigoscandia Food Process Systems AB of Helsingborg, Sweden) is disclosed in U.S. Pat. Nos. 3,938,651, 4,565,282, 4,603,776, 4,899,871, and 4,941,567. This apparatus, by virtue of its self-stacking spiral design and gas recirculation fans, channels the majority of gas flow downward through the multiple tiers of the open mesh conveyor, which carry the product.

By feeding product into the bottom of the conveyor stack, which is formed by the multiple tiers of the conveyor, and forcing air into the top of the conveyor stack, the overall flow of air and product is essentially countercurrent. The Frigoscandia device is well adapted for thermal treatment of discrete items that are conveyed by an open mesh conveyor belt that offers very little resistance to gas flow in the vertical direction. The present invention discloses an improvement over the known apparatus with the improvement allowing the machine to perform new tasks—including treating a packed bed of conveyed product to alter its moisture content or otherwise chemically or thermally treat the packed bed. Although the present invention is applicable to the removal of moisture and other chemicals from the conveyed material, the illustrative description will address only the addition of moisture or other chemicals from a high concentration treatment gas.

The discussion of the present invention will benefit from a description of the four different types of gas flow within the typical self-stacking spiral conveying apparatus.

(1) Vertical flow—gas flow through the openings in the bottom member of the conveyor links and the bed of conveyed product in an upward or downward direction;

(2) Radial flow—flow transverse to the conveyor belt links through perforations in the walls. Perforations include the gaps between successive conveyor belt links, the gaps between successive conveyor stack tiers, and the holes in the spacer members that make up the side walls of the conveyor stack, if such holes have been added to increase radial flow. Radial flow includes both radially inward and radially outward flows;

(3) Spiral flow—flow along the spiral trough formed by the self-stacking spiral conveyor belt. Spiral flow is influenced by among other factors, the clearance between the top of the bed of conveyed material and the bottom of the bottom element of the conveyor belt lying on top of the side walls; and (4) Bypass flow—flow along the exterior walls of the cylinder formed by the conveyor stack. The term bypass flow extends to all flow of gas outside of a flow path through the conveyor stack.

The present invention modifies a known device, such that several parameters of the gas within the device, including relative humidity, pressure temperature, velocity, flow direction, and concentration of any additive can be effectively controlled so as to provide control over the treatment given to the solid material on the conveyor.

The known Frigoscandia device is designed to give the proper gas flow pattern to thermally treat discrete items such as hamburger patties on a open mesh belt. Difficulty arose in part from the difference in the resistance to gas flow by the packed bed application.

Vertical gas flow is highly desirable because it treats the interior of the packed bed of conveyed material, instead of merely the material on the surface of the packed bed.

The amount of spiral flow could be controlled by the clearance between the packed bed of conveyed materials and the next tier of endless conveyor belt. The clearance could be controlled by adjusting the depth of the packed bed relative to the height of the side spacers. A second method of reducing the spiral flow would use upstanding flanges attached to the foraminous bottom member, the flanges being positioned at least partially transverse to the direction of belt travel.

Bypass flow fails to contact the product and is inherently not effective. Bypass flow is also a problem because treatment gas may enter the stack at the wrong point. For example, bypass flow may bypass upper tiers of the conveyor stack and then enter a lower tier of the conveyor stack to contact the bed of conveyed material. When this occurs, the gas in the bypass flow may have a more concentrated level of conditioning agent than is desired at that tier of the conveyor stack because the bypass flow did not previously contact all of the upper tiers of the bed of conveyed product to transfer the conditioning agent to the conveyed product. This exposure of conveyed product to treatment gas having elevated levels of conditioning agent, in a process where the material being processed follows a predetermined set of treatment conditions, may cause product damage, because the conveyed material may be intolerant to a deviation from the preset treatment conditions. For example, copending, commonly-assigned U.S. patent application Ser. No. 07/969,109 (PM-1612(II)), filed concurrently herewith and hereby incorporated by reference in its entirety, discloses processes for reordering and drying tobacco, teaches that conditioning air having a high relative humidity for use in the final stages of reordering tobacco is potentially damaging to tobacco in an earlier stage of reordering. This requirement of strictly segregating conditioning gas that is tolerated by the conveyed product only in the final stages of treatment from conveyed product entering treatment was not a problem faced by the known Frigoscandia device in its application of cooling products on an open mesh belt.

Thus, bypass flow may makes the prior art apparatus inefficient if used without modification to perform this new function of non-thermal treatments of a packed bed. One potential source of inefficiency related to bypass flow is the additional energy requirements to circulate and condition any additional treatment gas. While U.S. Pat. Nos. 4,089,666 and 4,178,946 describe improved processes for conditioning the air to specific conditions of temperature and relative humidity, the process remains energy intensive. The cost to treat the gas to a specific inlet condition is not a problem for the known Frigoscandia device when used in thermal treatments of products since the thermal energy in the small amounts of bypass flow in the open mesh thermal treatment conveyor process is recycled without loss in the conditioning means.

Thus, improved control of bypass flow is desirable especially for processes where the conveyed material is susceptible to damage from treatment gas that deviates from the prescribed treatment ramp. Therefore, it is highly desirable to have a device that treats a bed of conveyed product in a substantially uniform manner, thus resulting in a homogeneous, fully-treated product without damage from localized pockets of over-treatment. The present invention increases the uniformity of conveyed product treatment at commercial conveyor speeds and reduces wasteful recirculation of treatment gas.

SUMMARY OF THE INVENTION

It is therefore an object of this invention to provide improved control of the circulating gas in a gas-solid treatment apparatus.

It is also an object of this invention to provide substantially uniform treatment of products carried through the gas-treatment apparatus, independent of product position along the transverse axis of the conveyor belt.

It is a further object of this invention to provide control of the treatment gas having a high concentration of treatment agent to limit contact to only the conveyed product that meets preset treatment conditions.

It is a still further object of this invention to provide sufficient control over the process so that self-stacking spiral conveyor belt systems of standard, commercially available sizes may be modified in accordance with this invention for use without the added expense of requiring custom-built conveyor stacks or other non-standard equipment, such as the means for circulating gas.

It is an even further object of this invention to provide an apparatus that has commercial product-processing rates through a combination of control of conveyor belt speed and depth of the packed bed without detrimental effects to product quality.

These and other objects are met by a gas-treatment apparatus which comprises a housing having an infeed and an outfeed. An endless conveyor belt that runs through the infeed into the housing, follows a spiral path comprising several superimposed tiers in the housing, and runs through the outfeed opening of the housing. The conveyor belt has links that are relatively moveable, enabling the conveyor belt to follow its path, with each link having a fixed rod and an articulation rod and a spacing member at each side of the conveyor belt for supporting the conveyor belt in an overlying tier. The two rods are attached to the side spacers with one end of the articulation rod free to slide in a slot. The bottom member is attached to one or both rods and overlaps successive bottom members but does not impair the belt links from articulating. The endless conveyor belt in its spiral path forms a conveyor stack in the form of hollow cylinder having a perforated inner wall and a perforated outer wall comprising the spacing members and defining a vertical tube bounded by the spacing members comprising the inner wall of the hollow cylinder drum. Perforations in the perforated inner and outer walls include the gaps between successive conveyor belt links, the gaps between successive conveyor stack tiers, and the holes in the spacer members that make up the side walls of the conveyor stack, if such holes have been added to increase radial flow. An inner partition, covering the area of the inner cross-sectional area defined by the perforated inner wall of the hollow cylinder, is provided. An outer partition, running from adjacent the perforated outer wall of the hollow cylinder formed by the conveyor stack to the inner sides of the housing, is provided. Both the inner and outer partitions run adjacent to the hollow cylinder, but are not attached to the hollow cylinder which spirals relative to the inner and outer partitions.

A means for producing a circulating gas flow is provided. The circulating treatment gas passes into the housing above the conveyor stack, then flows down substantially through the conveyor stack to the area of the housing below the conveyor stack before exiting the housing to return to the circulating means and the conditioning means.

In addition, there is at least one additional chamber having an open side adjoining either the perforated inner or perforated outer wall of the hollow cylinder formed by the conveyor stack of superimposed tiers. The chamber extends axially along part of the height of the hollow cylinder and around the either the interior or exterior circumference of the hollow cylinder. The additional chamber is formed by an additional partition at either the inside of the hollow cylinder or outside of the hollow cylinder and serves to obstruct the flow of gas.

The additional chamber also comprises a means for conditioning at least one parameter of the treatment gas passing through the conveyor belt stack, adjacent to and also downstream of the additional chamber. The means may be a separate means such as an injection port, vent, heat exchanger, or other means of altering the gas within the chamber, including the additional chamber itself. The additional chamber may alter gas parameters such as the pressure of the ambient gas in the chamber by isolating the gas from other zones of higher or lower pressure. In addition to changes in the conditioning gas flow patterns due to local pressure in the chamber, chamber walls will alter local flow paths as the treatment gas changes direction to move around the obstruction of the chamber walls.

Several additional chambers may be provided adjoining the perforated inner wall or perforated outer wall of the hollow cylinder formed by the conveyor stack. The axial position of each additional chamber is determined by the need to influence the parameter in question at different heights in the conveyor stack.

The present invention increases the amount of vertical flow through the packed bed of conveyed product without requiring expensive modifications of the apparatus. Additionally, the present invention avoids excessive mechanical resistance to rotation of the spiraling conveyor stack from an abundance of seal strips, to channel the air through the conveyor stack. Another benefit is that the apparatus can be easily and effectively cleaned, which is highly desirable in the processing of cosmetics, drugs, food, tobacco, and other products.

BRIEF DESCRIPTION OF THE DRAWINGS

Other objects and advantages of the present invention will become apparent to one skilled in the art upon reading the following detailed description with the accompanying drawings, in which like reference characters refer to like parts throughout, and where.

DESCRIPTION OF THE PREFERRED EMBODIMENT

Figure 1:
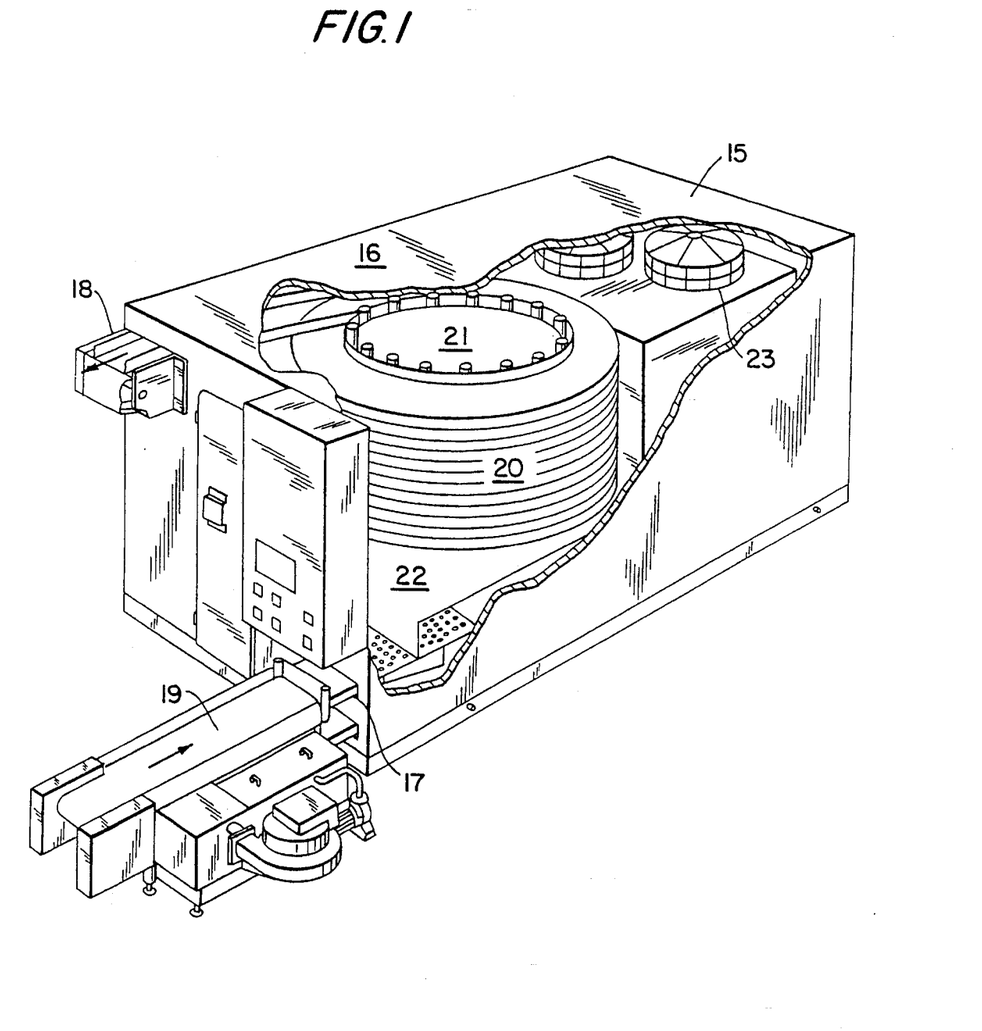
FIG. 1 is a perspective view of an air-treatment apparatus in which the present invention is applicable.

The gas-treatment apparatus 15, shown generally in FIG. 1, comprises a housing 16 having an infeed opening 17 and an outfeed opening 18. An endless conveyor belt 19 runs through the infeed opening 17 into the housing 16. In the housing 16, the endless conveyor belt 19 follows along at least a portion of its length a spiral path comprising several superimposed tiers to form a conveyor stack 20. The endless conveyor belt 19 then exits the housing 16 through the outfeed opening 18. After exiting, the endless conveyor belt 19 returns to the infeed opening 17. Exemplifying embodiments of the conveyor belt 19 that may be used in the apparatus according to the present invention are disclosed in e.g., U.S. Pat. Nos. 3,938,651, 4,603,776 and 4,941,567, all assigned to Frigoscandia Contracting AB of Sweden and incorporated herein by reference. The conveyor belt modification to treat small items or packed beds is disclosed in copending, commonly-assigned U.S. patent application Serial No. 07/969,761, which issued Sep. 13, 1994, as U.S. Pat. No. 5,346,057 (PM-1624), filed concurrently herewith and hereby incorporated by reference in its entirety.

The conveyor stack 20 formed by the endless conveyor belt 19, is supported by a second endless conveyor (not shown) positioned under the undermost tier in the conveyor stack 20. This second conveyor may be of the type described in e.g., U.S. Pat. Nos. 3,938,651, 4,565,282, and 4,899,871 all assigned to Frigoscandia Contracting AB of Sweden and incorporated herein by reference. In order to enhance their visibility in the perspective drawing, inner partition 21 is shown near the top of the conveyor stack 20 and outer partition 22 is shown near the bottom of the conveyor stack 20. Also shown in FIG. 1 are the fans 23 used as a means for circulating treatment gas.

Figure 2:
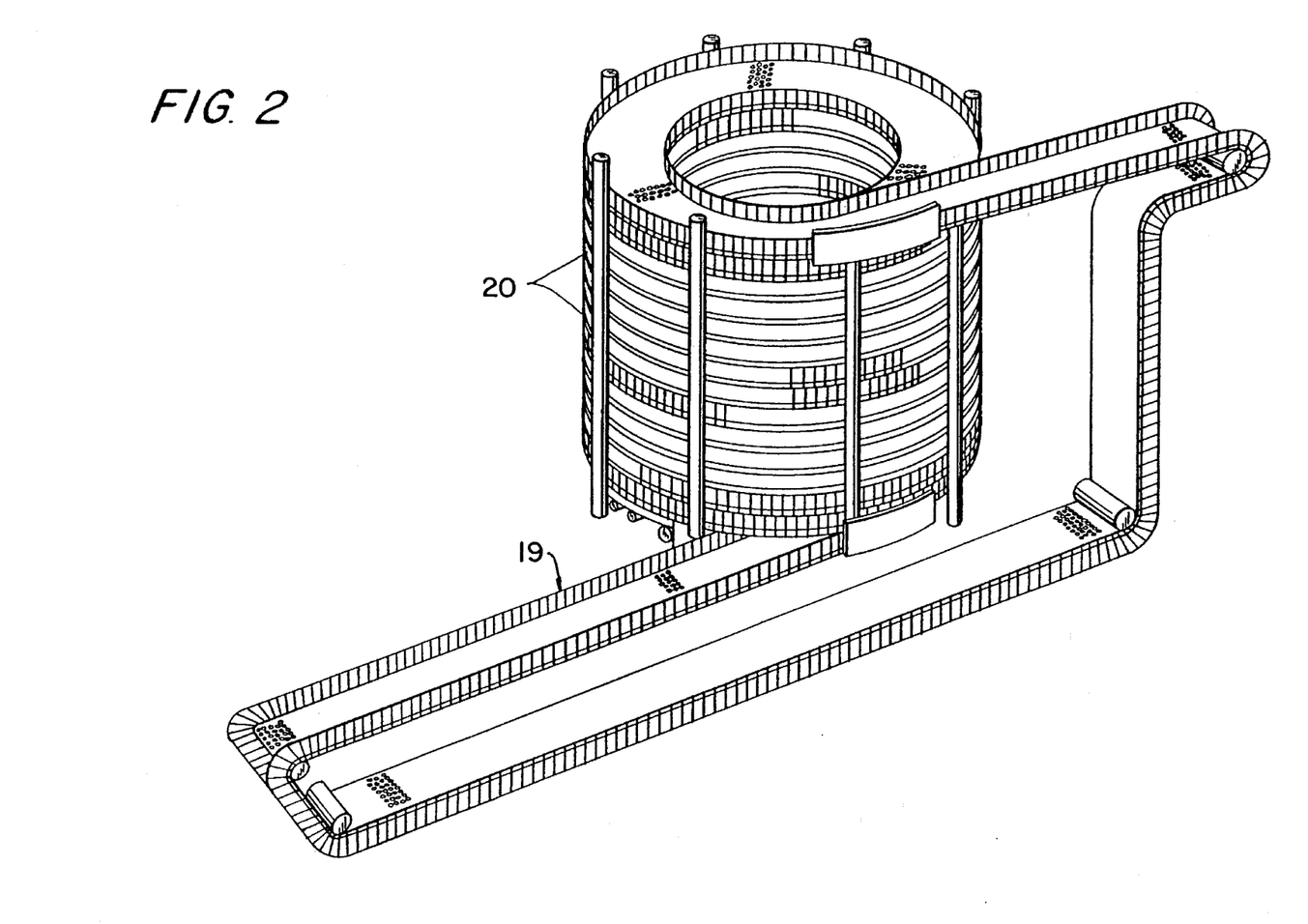
FIG. 2 is a detail drawing showing the endless conveyor belt and the self-stacking, spiral conveyor.

FIG. 2 shows the endless conveyor belt 19 and the conveyor stack 20 it forms, removed from the housing (but in an alternate belt configuration from FIG. 1). In FIG. 2 the endless conveyor belt 19 is configured for infeed and outfeed at opposing ends of the same tangent to the conveyor stack 20.

Figure 3:
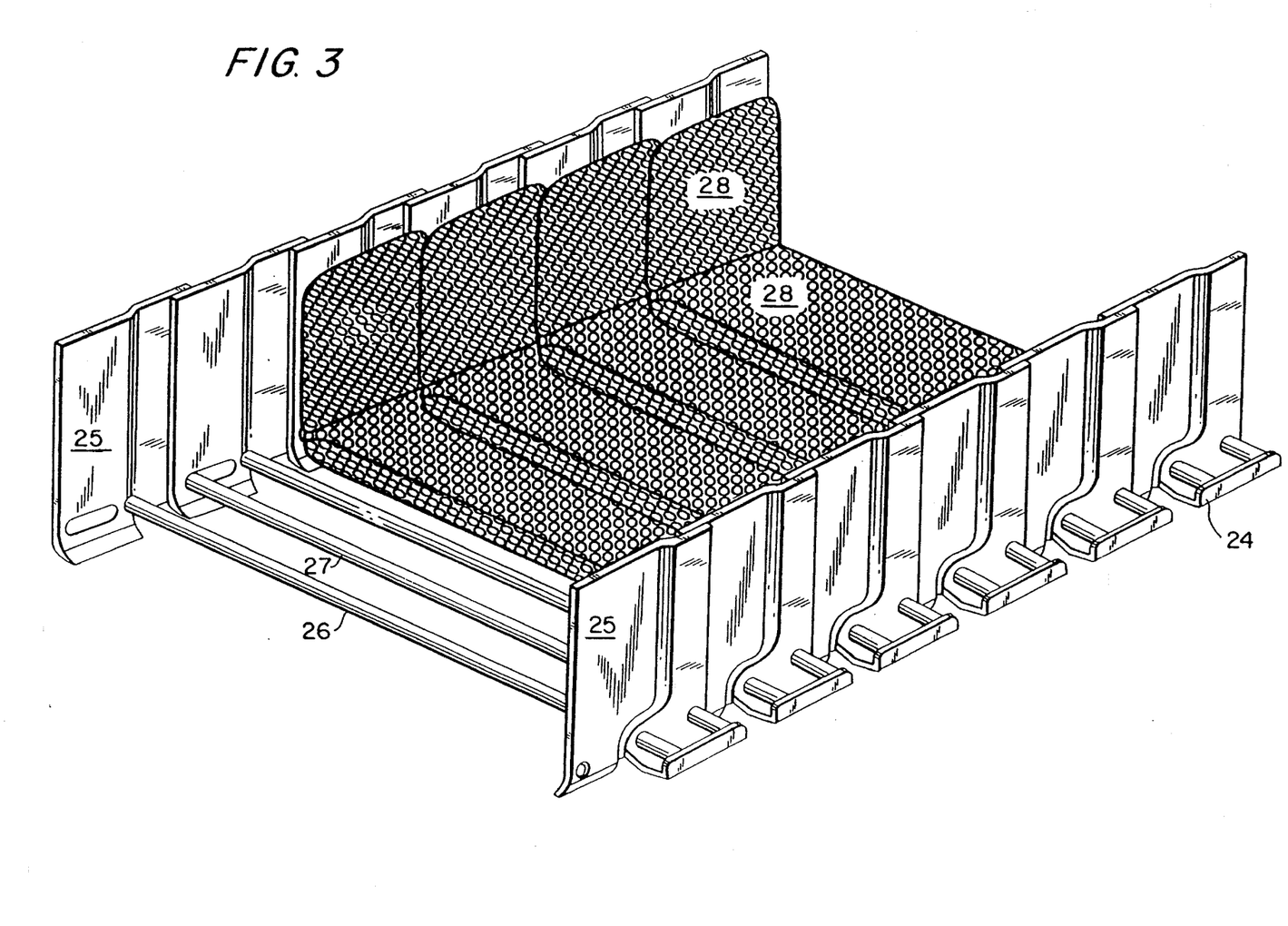
FIG. 3 is a detail drawing showing a series conveyor belt links.

The endless conveyor belt 19 is of the self-supporting type and consists of a plurality of conveyor links 24 show in FIG. 3. The conveyor links 24 are mutually moveable in such a way that the belt can follow the paths illustrated in FIGS. 1 and 2. More precisely, each conveyor link 24 of the conveyor belt 19 comprises two spacer members 25 one at each side of two rods. The fixed rod 26 is fixedly attached at both spacer members 25, and an articulation rod 27 is fixedly attached at the spacer member via a slot to the spacer member 25 that will be on the inner radius of the conveyor stack 20. A foraminous bottom member 28 through which the air flow may pass, is fixedly attached to both rods 26 and 27 and fits between the two spacer members 25. The foraminous bottom members 28 overlap one another and are shaped so as to allow the endless conveyor belt 19 to freely articulate into the conveyor stack 20 where articulate is defined as bending or other relative motion at jointed, slotted or other types of connections. The spacer members 25 support the overlying tiers of the conveyor stack 20. The foraminous bottom member 28 being designed to allow adequate flow of air through foraminous bottom member 28 while retaining the conveyed material. Said bottom member being more fully described in copending, commonly-assigned U.S. patent application Ser. No. 07/969,761, which issued Sep. 13, 1994, as U.S. Pat. No. 5,346,057 (PM-1624).

Figure 4:
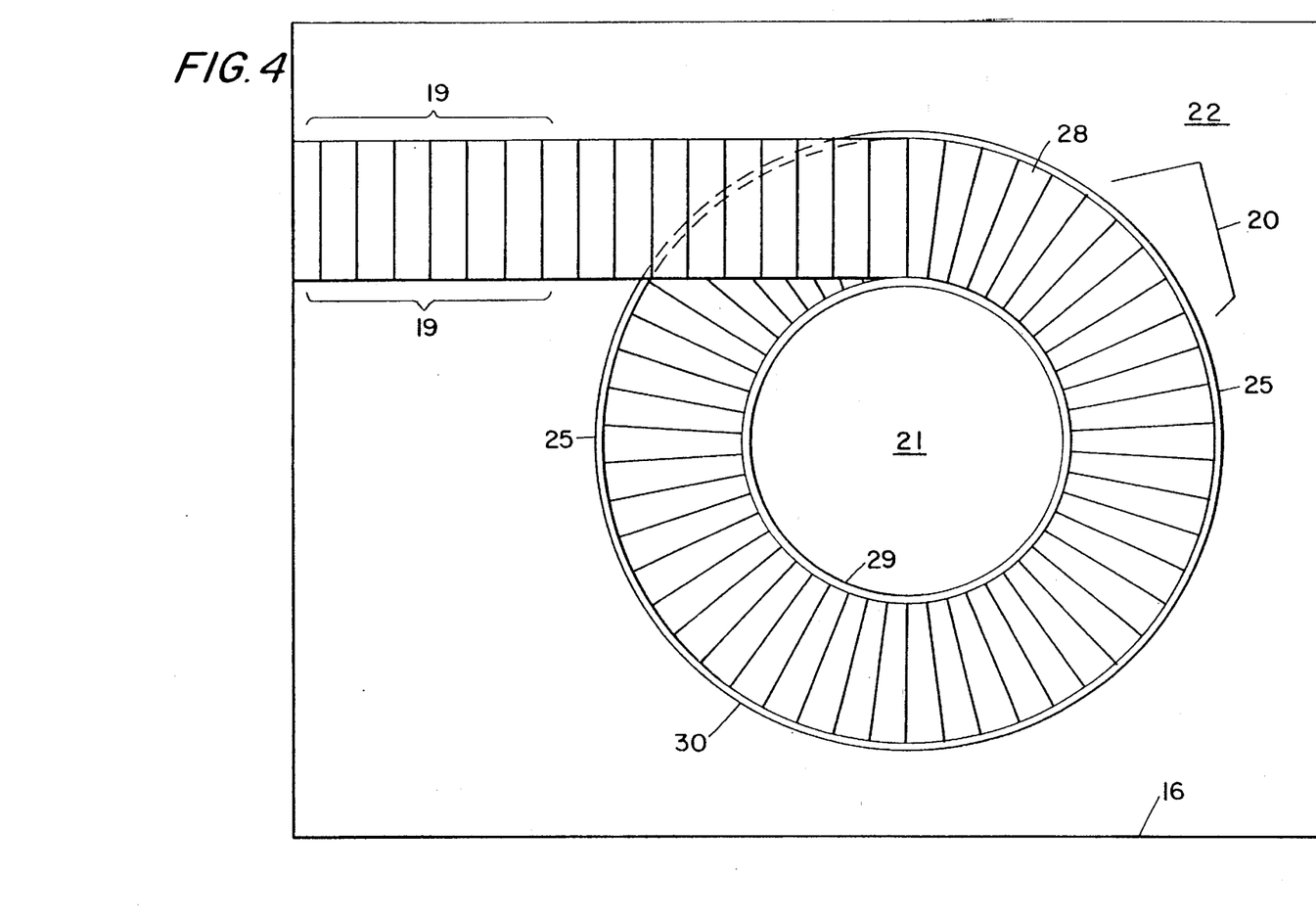
FIG. 4 is a view looking down on the conveyor stack and showing the top-most partition plates and inner sides of the housing when used with a packed bed of conveyed material.

FIG. 4 is a view from above apparatus 15 with the portion of the top housing 16 removed exposing the top edges of the side walls of the housing 16, the endless conveyor belt 19 as it passes through the outfeed opening 18 (not shown in FIG. 4), and the conveyor stack 20. The spacer members 25 form the hollow cylinder having a perforated inner wall 29 and a perforated outer wall 30. The walls are perforated at least as a consequence of slits formed between the mutually engaging spacer members 25 of the conveyor belt links 24 and the incidental gaps formed between successive tiers of endless conveyor belt 19 in the conveyor stack 20. Additional holes, slits, or other openings to gas flow could be added to the side spacer members 25 to increase the amount of gas flow through the spacer elements. The hollow cylinder walls 29 and 30 are separated by the fixed rod (not shown in FIG. 4) 26, articulated rod (not shown in FIG. 4) 27, and the foraminous bottom member 28 that is attached to the rods.

Figure 6:
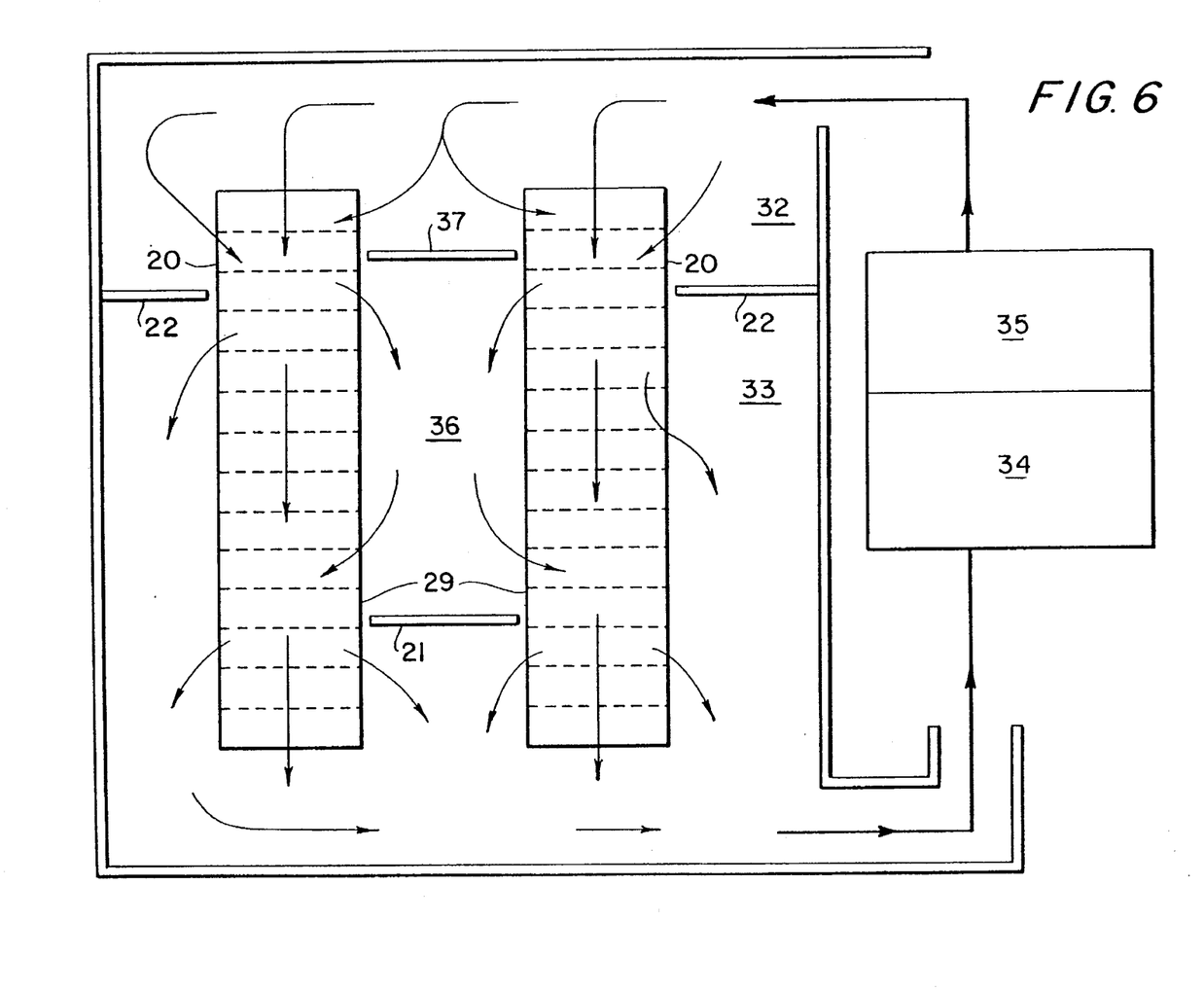
FIG. 6 is a cross-sectional view of the conveyor stack illustrating a first embodiment of the present invention.

The inner partition 21 is an obstruction to gas flow down the tube defined by the hollow cylinder perforated inner wall 29, i.e., the center of the hollow cylinder. Thus, the inner partition 21 substantially seals the hollow tube defined by the perforated inner wall 29 in a circumferential manner to direct the flow of treatment gas through the center of conveyor stack 20. This obstruction is also illustrated in FIG. 6 which shows a cross section of the conveyor stack 20 and housing 16. The outer partition 22 shown in FIGS. 4 and 6, running from the inner walls of the housing 16 to the hollow cylinder perforated outer wall 30, is a second obstruction to gas flow. Each partition, as described herein, serves the function of substantially sealing a wall of the hollow cylinder formed by the conveyor stack 20 to direct the flow of treatment gas through the conveyor stack. The partition can be made of any material that blocks gas flow. A preferred embodiment material for the partitions is one-quarter inch thick stainless steel plate. A partition made of this material allows the partition to support the weight of technicians that clean or otherwise service the conveyor stack.

Figure 5:
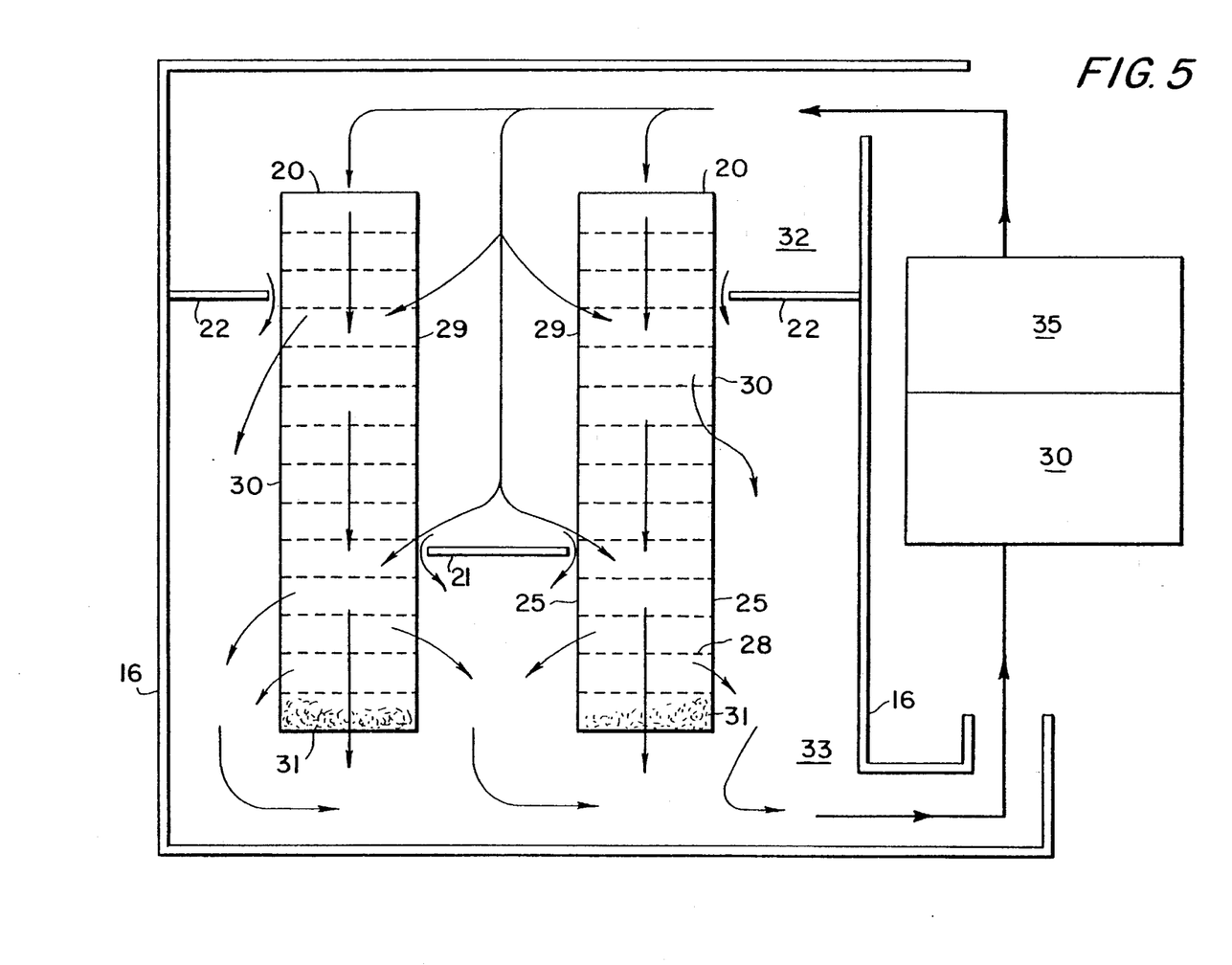
FIG. 5 is a cross-sectional view of the conveyor stack illustrating the gas flow pattern of the known Frigoscandia device.

FIG. 5 illustrates the deficiencies of the known device when used to treat a packed bed of conveyed material (illustrated on a single tier by 31). The arrows indicate the flow path of the treatment gas that is used to treat the conveyed product carried in the trough formed by the foraminous bottom member 28 lying between the spacer members 25. Ignoring the bypass flows along the gap between outer partition 22 and perforated outer wall 30, and the gap between inner partition 21 and perforated inner wall 29, the treatment gas enters the upper chamber 32 and is forced by the combined action of inner partition 21 and outer partition 22 to enter the conveyor stack 20. The treatment gas enters the conveyor stack 20 through either the top of the conveyor stack 20, the perforated outer wall 30 above outer partition 22 or the perforated inner wall 29 above the inner partition 21. The treatment gas then moves essentially downward through the tiers of the conveyor stack 20 and through the packed beds of conveyed material 31. The treatment gas exits the conveyor stack 20 through the bottom of the conveyor stack and the second endless conveyor (not shown) upon which the conveyor stack rotates or, the perforated outer wall 30 below outer partition 22, or the perforated inner wall 29 below inner partition 21. After exiting the conveyor stack 20 into the lower chamber 33, the spent treatment gas then leaves the housing 16 and passes through the means for circulating the treatment gas represented by 34 and the means for conditioning the treatment gas represented by 35. Note that the fans 23 shown in FIG. 1 are one type of means for circulating gas 34. The present invention does not depend on the order of steps 34 and 35.

A preferred embodiment of this invention utilizes downward vertical flow rather than upward vertical flow because of the higher tolerance of a packed bed to downward flow velocity than upward flow velocity. The primary problem with upward vertical flows is airborne particles. Airborne particles can suffer impingement damage from striking one another or from striking the conveyor stack. Airborne particles are also at risk to exit the conveyor stack, especially from the top tier of the conveyor stack, thus creating both housekeeping problems and yield losses.

Another problem with upward vertical flow is the channeling of the packed bed as the upward vertical flow causes the product to separate to form product-free channels in the packed bed. However, excessive downward vertical flow rates can cause compaction of the packed bed; and compaction, like channeling, changes the resistance of that portion of the bed to gas flow and changes the overall resistance of the bed to gas flow in the vertical direction. Channeling occurs at lower gas velocities than compaction and airborne particles are a phenomenon of upward vertical flow only. Therefore, the packed bed is tolerant of a higher downward vertical flow than upward vertical flow.

A close examination of the flow path arrows in FIG. 5 highlights the problems with use of the known Frigoscandia device in the new application of a non-thermal treatment of a packed bed. On the inside of the hollow cylinder formed by the conveyor stack 20, some treatment gas flows deep into the center tube of the conveyor stack before inner partition 21 forces this treatment gas into the relatively low tiers of the conveyor stack. The high concentration treatment gas may damage conveyed material that is in the lower, i.e. early tiers of treatment.

In addition to the small bypass flows around partitions 21 and 22, some treatment gas exits the perforated outer wall 30 very close to outer partition 22. This treatment gas is still at an elevated concentration of treatment agent. The concentrated treatment gas either wastefully exits the lower chamber 33 to undergo the steps of conditioning in 34 and circulation means 35 or re-enters the lower tiers of the conveyor stack. In operation, if the clearance between the perforated outer wall 30 and the housing 16 is sufficient to preclude pressure pockets, the leakage into the perforated outer wall 30 will be negligible. Even if pressure pockets form between the conveyor stack 20 and housing 16 the pressure of the gas in upper chamber 32 is much higher than the pressure of the gas in lower chamber 33. Therefore the gas flow into the perforated inner wall 29 will be much greater than the leakage into the perforated outer wall 30. But any mismatch between the state of the treatment gas and the state of the conveyed material can cause damage to the conveyed material.

FIG. 6 illustrates how the present invention improves the flow path of the treatment gas. In FIG. 6 a first additional chamber 36 is created by the addition of a first additional partition 37. The additional chamber generally extends axially over only a portion of the height of the conveyor stack 20, but in a preferred embodiment extends circumferentially around the entire perforated inner wall 29 or perforated outer wall 30. The addition of a partition changes the flow of treatment gas into the lower tiers of the perforated inner wall 29, because it is an obstruction to the flow of gas. The additional partition is preferably perpendicular to the perforated inner or outer wall, but may be at a different pitch such as the incline angle of the conveyor stack. The first additional partition 37 prevents high pressure, high concentration, treatment gas of the upper chamber 32 from flowing down the center of the hollow cylinder formed by the conveyor stack 20 and entering the lower tiers of the conveyor stack. Ignoring the small amounts of bypass flow around first additional partition 37, the flow of treatment gas from the first additional chamber 36 into the conveyor stack 20 is comprised of treatment gas that has already been in the upper tiers of the conveyor stack 20. Thus the gas in first additional chamber 36 is at a pressure between the pressure of upper chamber 32 and lower chamber 33. The flow pattern in FIG. 6 more closely approximates the desired flow of treatment gas through a packed bed of conveyed material, i.e., essentially countercurrent. Pressurized zones formed by chambers adjacent to the conveyor stack, aid in keeping the treatment gas in the conveyor stack.

Figure 7:
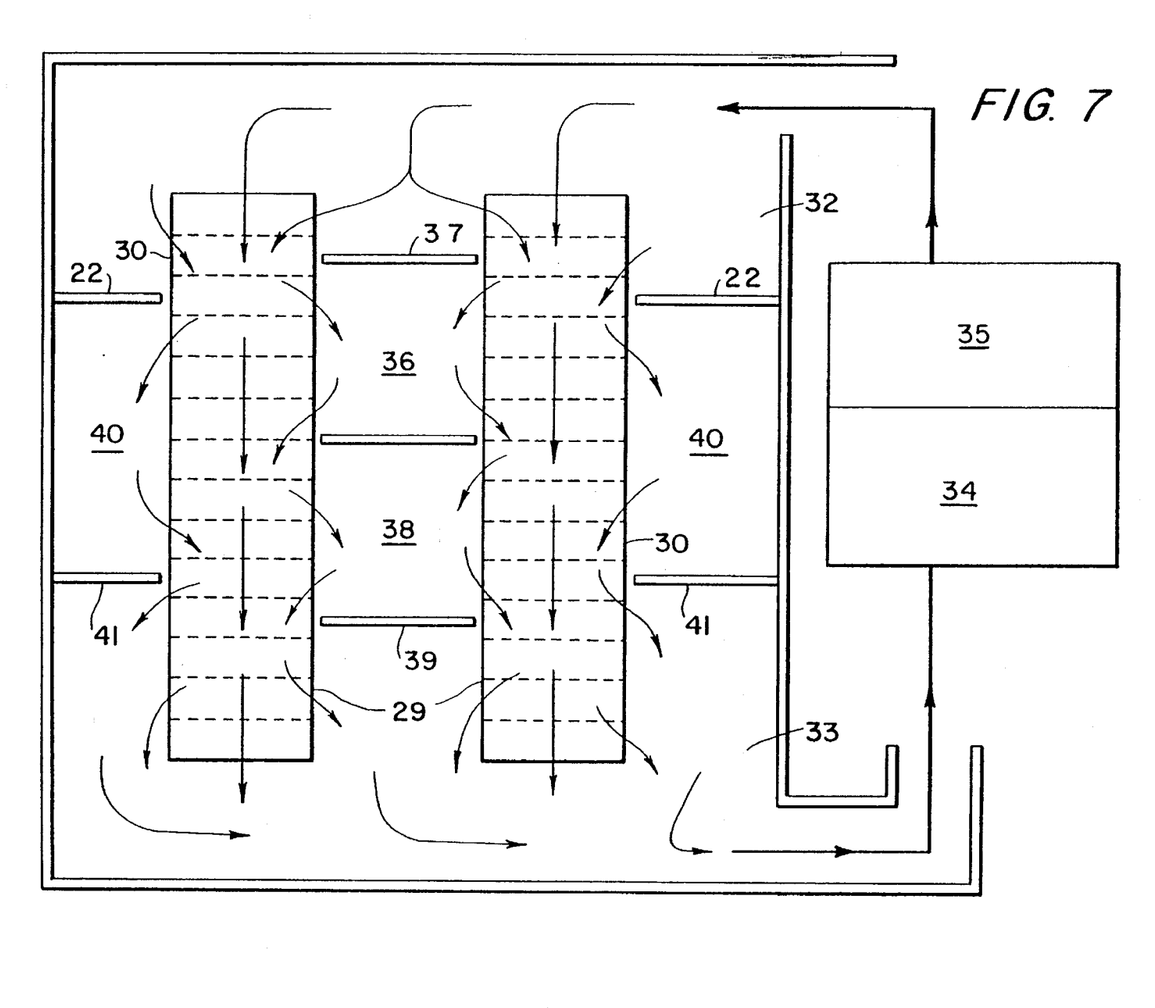
FIG. 7 is another cross-sectional view of a second embodiment of the present invention.

FIG. 7 shows a second embodiment of the present invention. In FIG. 7, a second additional chamber 38 is created in the tube inside the hollow cylinder formed by the conveyor stack 20 by the addition of a second additional partition 39. Also shown is a third additional chamber created by the addition of a third additional partition 41 around the outside of the hollow cylinder formed by the conveyor stack. The additional chambers 36, 38, and 40 all work to control the environment around the conveyor stack perforated walls 29 and 30, so as to create a series of decreasing zones of pressure outside of the conveyor belt tiers. The embodiment of FIG. 7 directs the gas flows exiting the conveyor stack tiers back into the conveyor stack very close to where the flows exited the conveyor stack tiers. This serpentine-like path for flow closely approximates countercurrent flow, significantly increases contact between treatment gas and conveyed product, and prevents exposure of the packed beds in the lower tiers to treatment gas of a treatment agent concentration which might only be tolerated by upper tier packed beds. This increase in contact between the treatment gas and the conveyed product is most pronounced where there is high resistance to flow, such as in a packed bed application.

Figure 8:
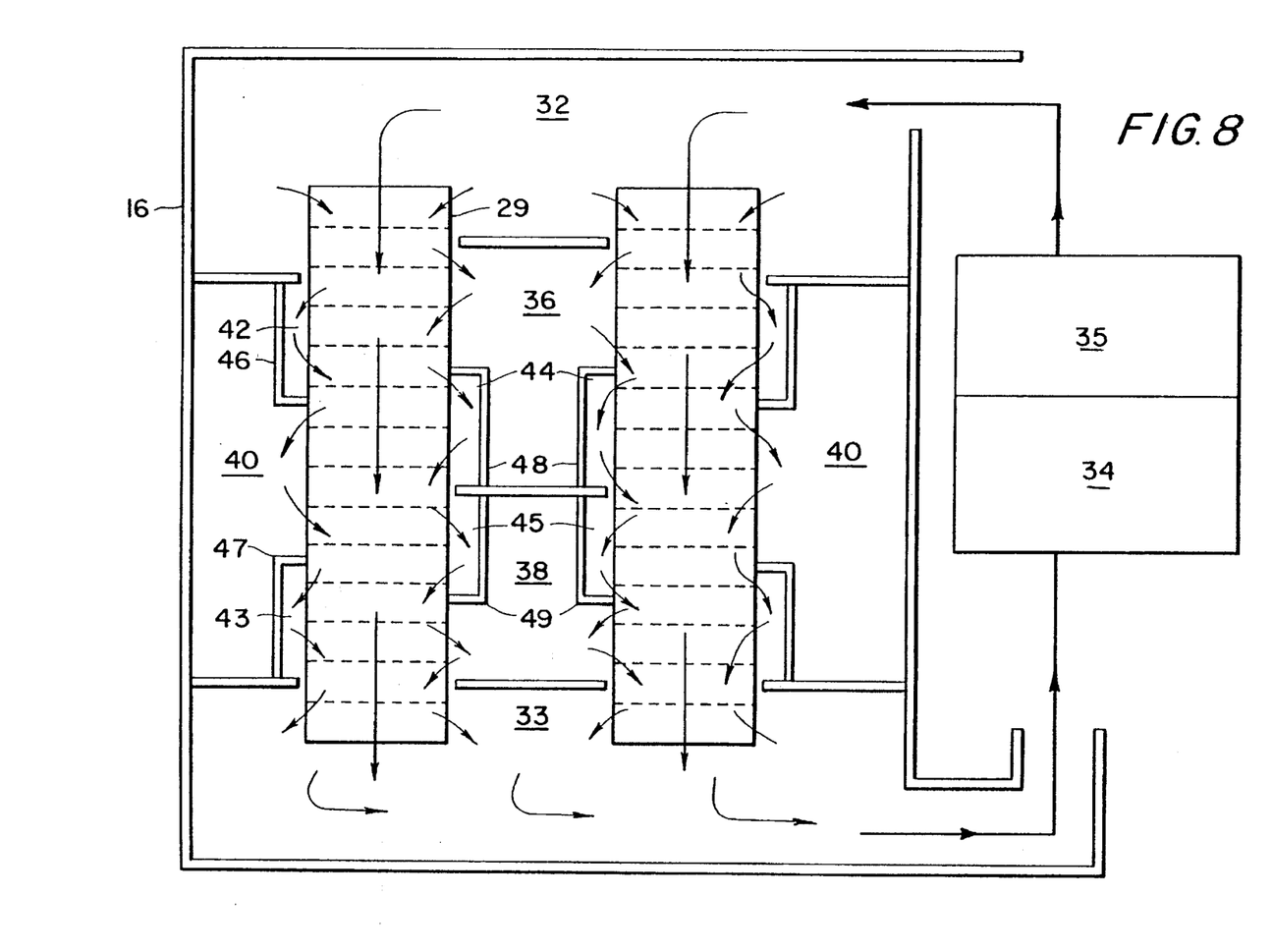
FIG. 8 is a third cross-sectional view of a third embodiment of the present invention.

FIG. 8 is an another embodiment of the present invention. Additional chambers 42, 43, 44, and 45 are created by connecting "L"-shaped partitions 46, 47, 48, and 49, to the existing horizontal partitions. Such additional "L"-shaped partitions may have advantages for certain applications over additional outer partitions that connect to housing 16 or inner partitions that fill the entire circle formed by the perforated inner wall 29 of the conveyor stack 20 because the "L"-shaped partitions preserve large spaces inside the device for personnel access to clean or otherwise maintain the device.

Figure 9:
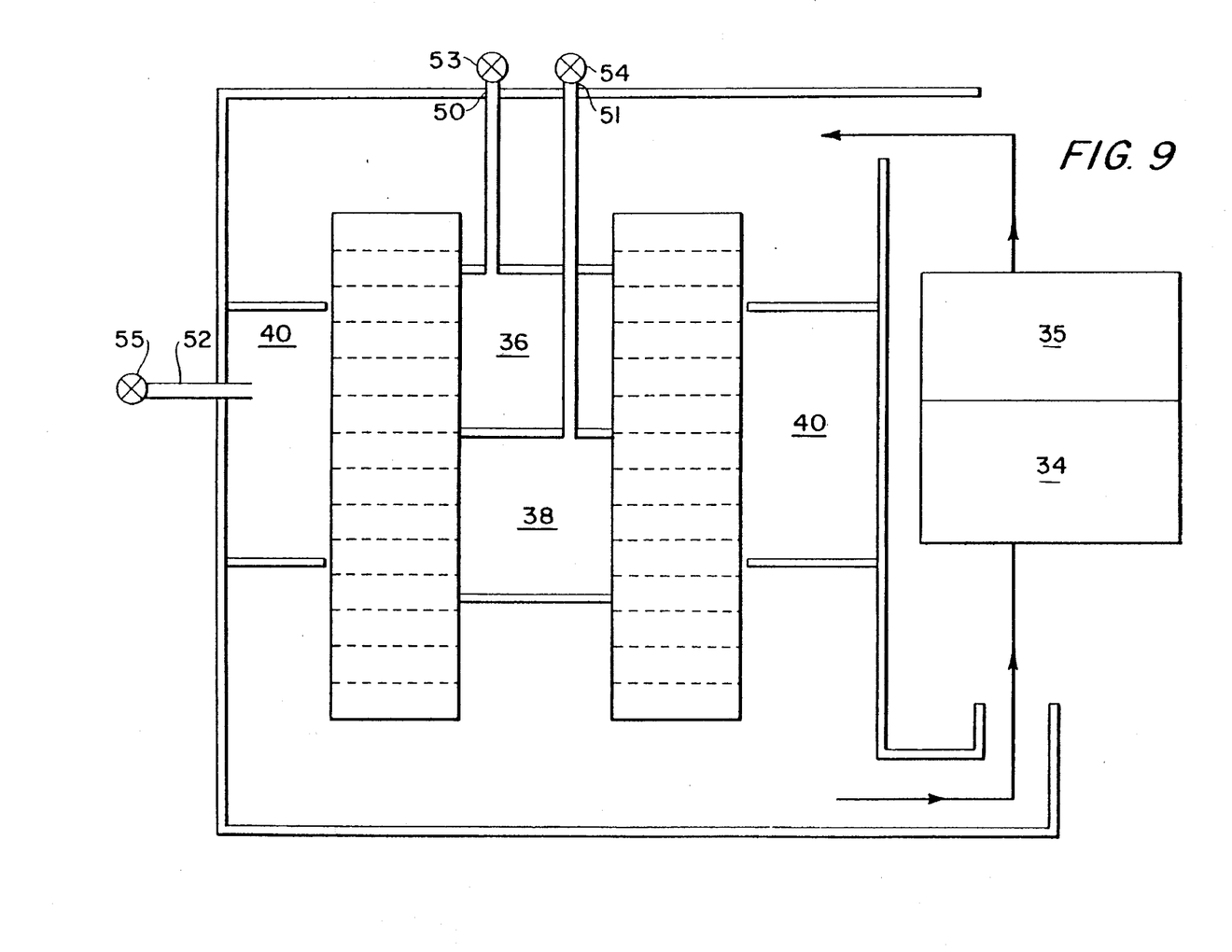
FIG. 9 is a fourth cross-sectional view of a fourth embodiment of the present invention.

FIG. 9 illustrates additional optional features of the chambers created by the additional partitions. Pipes 50, 51, and 52 are connected into chambers 36, 38, and 40 respectively. The gas fed through the pipes into the chambers may be independently controlled as represented by controls 53, 54, and 55 respectively. Independent control of the gas flow into a chamber from a source other than leakage from the conveyor stack affords additional control over the process. Judicious selection of the pressure of the gas sent to a chamber can provide control of the net flow out of the chamber and into the conveyor stack. The independent source of treatment gas could send treatment gas of a particular strength to that chamber, e.g., air of specific relative humidity to alter the humidity gradient in the conveyor stack while reordering tobacco. This would effect the treatment in the conveyor stack in the tiers adjacent to that chamber and downstream from that chamber.

Alternatively, the chamber could be vented rather than pressurized by the pipe and control means. Decreasing the pressure in a chamber could increase the net flow of treatment gas through the adjacent perforated walls 29 or 30 of the conveyor stack 20 into that chamber. Venting a specific chamber could remove undesired gases from the apparatus, e.g., volatile gases emitted during a drying operation, or inert gases present in a process using steam.

Additionally, the pipes 50, 51, 52 could be connected to steam or water spraying systems into one or all of the chambers so as to exercise additional control over the relative humidity gradient of the gas flowing down the conveyor stack. Similarly, other additives in the forms of liquids or gases or even powders sufficiently fine to be entrained by the gas flow could be added in a controlled manner to one or more chambers. Treatment gas vented from one chamber could be circulated into another chamber by a natural pressure gradient or through the use of a means for circulation.

One of skill in the art will appreciate that the addition of chambers with independent piping and control means enables a more precise control of the treatment gas flow through the conveyor stack 20, e.g., the velocity of the gas at different heights in the conveyor stack 20 and allows introduction of various additives into the gas flow so that the conveyed material could receive treatment by more than one type of treatment gas in a sophisticated application of the present invention. Each chamber could, of course, be provided with multiple pipes and control means should process control require such refinement. For example, a chamber could be connected to both a high pressure source and a low pressure vent to give a greater range of pressure control of the chamber.

Also one of skill in the art will appreciate that the present invention could be further modified to include sensors (e.g., pneumatic or electronic) within the chambers or connected thereto by sampling piping. The sensors could be used to trigger investigation by apparatus operator, invoke operator initiated or automatic responses in the apparatus control settings, such as changing the moisture sent to a given chamber by the injectors or opening or closing the path for flow though one of the pipes into a chamber, or activating thermal conditioning of the gas within a chamber to alter the temperature or relative humidity of the gas. The corrective action could also occur upstream or downstream of the chamber being monitored. For example, the means for conditioning the treatment gas 35 or the means for circulating the treatment gas 34 could be adjusted based on a gradient evidenced by a comparison of measurements taken in chambers.

The efficiency of this invention can be increased by the use of any one of several means known in the art to seal the gaps between the partitions 21, 22, 37, 39, 41, 46, 47, 48, and 49 and the perforated walls 29 or 30 of the conveyor stack 20. The seal selected must be compatible with the type of conveyed product being treated. For example, seals used in a device that treats tobacco must meet applicable standards for tobacco processing such as seal hygiene and not unduly contaminate the tobacco product during the wear of the seal.

Figure 10:
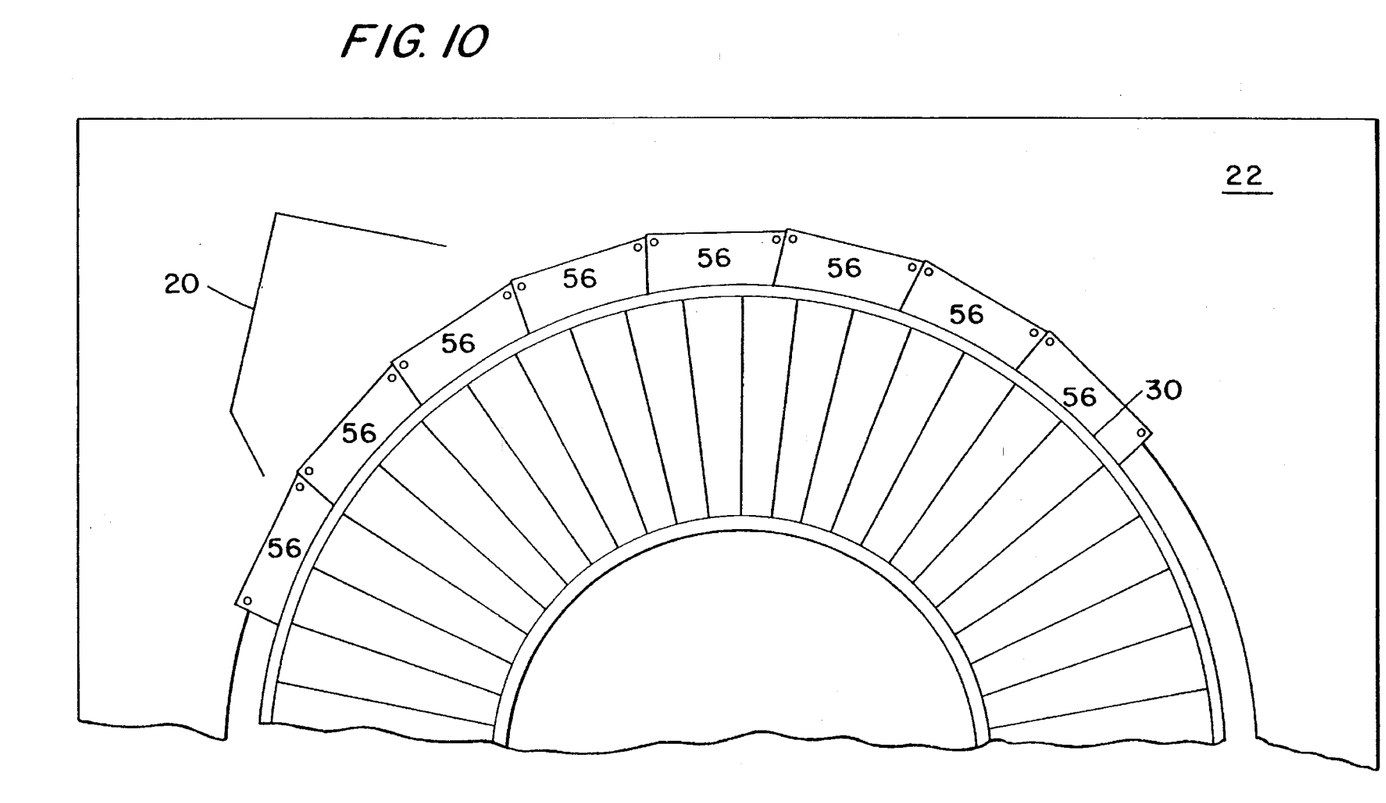
FIG. 10 illustrates a seal between the exterior wall of the conveyor stack and a partition used to form a chamber.

FIG. 10 illustrates a top view of one form of seal 56. This seal 56 is a multiplicity of plastic strips of high density polyethylene mounted on the outer partition 22. The seal 56 is sized to fill the gap, which has been enlarged to show detail, between the outer partition 22 and the perforated outer wall 30 of the conveyor stack. The drag on the rotation of the conveyor stack 20 and the wear rates of the seal 56 place limits on the level of sealing achievable by the seals. Some form of gas seal such as seal strips could also be employed where the endless conveyor belt passes through the housing at the infeed opening 17 and the outfeed opening 18. Other methods of sealing gas flow exist including seal skirts, bristles, and air curtains. Sealing may be facilitated by adjusting the orientation of the partitions to match the slope of the ascending conveyor stack tiers A properly configured apparatus disclosed by the present invention may afford multiple treatments of a product to occur simultaneously or sequentially during a single pass on the conveyor belt of this apparatus. Additionally, the present invention discloses the means for one skilled in the art to exercise improved control of the parameters of temperature, pressure, and velocity of the conditioned gas. These parameters are important in many applications where control of the gradient of the concentration of the treatment agent in the treatment gas is not the only parameter that must be controlled. For example, the control of vertical velocities is necessary in packed bed applications to avoid airborne particles, channeling or compaction of the packed bed.

It is further appreciated that one skilled in the art could reverse the predominant flow path of the treatment gas from predominantly downward to predominantly upward. Likewise, the conveyor belt could be designed to send the packed bed product spiraling downward rather than upward. The combination of conveyance of packed bed downward and gas flow of treatment gas upward would be an alternative means of achieving countercurrent flow.

One skilled in the art will appreciate that the present invention can be practiced by other than the described embodiments, which are presented for purposes of illustration and not of limitation.

We claim:

1. An apparatus for treatment of solid material, comprising:
   (a) a conveyor belt at least a portion of which travels within a housing;
   (b) means for circulating gas through the housing;
   (c) wherein, inside the housing, the belt follows a spiral path for at least a portion of its length, the belt comprising links and a bottom member, such that the belt forms a spiral stack of conveyor belt tiers in the shape of a hollow cylinder having a perforated inner wall and a perforated outer wall;
   (d) an inner partition positioned in the center of the hollow cylinder, such that the inner partition is adapted to obstruct the flow of gas down the inside of the hollow cylinder;
   (e) an outer partition positioned between the outer wall of the hollow cylinder and the housing, such that the outer partition is adapted to obstruct the flow of gas down the outside of the hollow cylinder; whereby the housing, outer partition, and inner partition, and hollow cylinder form an upper chamber and a lower chamber;
   (f) at least one additional outer partition positioned between the outer wall of the hollow cylinder and the housing, such that each additional outer partition is adapted to obstruct the flow of gas down the outside of the hollow cylinder, such that an additional chamber is formed by the addition of the additional outer partition;
   (g) whereby as the circulating means circulates gas through the housing, the inner partition, outer partition, additional outer partitions direct the flow of gas through the stack of conveyor belt tiers.

2. The apparatus of claim 1, further comprising means for influencing at least one parameter of the gas flow through the conveyor stack either attached to the additional outer partition or downstream from the additional outer partition.

3. The apparatus of claim 2, wherein the influencing means are ejectors, influencing at least one of the gas parameters selected from the group consisting of temperature, pressure, velocity, humidity, or any combination of these.

4. The apparatus of claim 2, wherein the influencing means are vents.

5. The apparatus of claim 1, further comprising at least one inlet pipe extending through any of the additional outer partition, the inner partition, the outer partition, or the housing.

6. The apparatus of claim 1 further comprising at least one additional chamber having an open side adjacent to either the perforated inner wall or perforated outer wall of the hollow cylinder and extending axially along at least a part of the height of the conveyor stack and around the entire circumference of either the perforated inner wall or the perforated outer wall of the conveyor stack; and whereby as the circulating means circulates gas through the housing, the inner partition, outer partition, additional outer partition, and additional chambers direct the flow of gas through the stack of conveyor tiers.

7. An apparatus for treatment of solid material, comprising:
   (a) a conveyor belt at least a portion of which travels within a housing;
   (b) means for circulating gas through the housing;
   (c) wherein, inside the housing, the belt follows a spiral path for at least a portion of its length, the belt comprising links and a bottom member, such that the belt forms a spiral stack of conveyor belt tiers in the shape of a hollow cylinder having a perforated inner wall and a perforated outer wall;
   (d) an inner partition positioned in the center of the hollow cylinder, such that the inner partition is adapted to obstruct the flow of gas down the inside of the hollow cylinder;
   (e) an outer partition positioned between the outer wall of the hollow cylinder and the housing, such that the outer partition is adapted to obstruct the flow of gas down the outside of the hollow cylinder; such that the housing, outer partition, and inner partition, and hollow cylinder form an upper chamber and a lower chamber;
   (f) at least one "L"-shaped inner partition positioned within the hollow cylinder, such that each "L"-shaped inner partition is adapted to obstruct the flow of gas from the perforated inner wall of the hollow cylinder from going down the inside of the hollow cylinder; such that an "L"-shaped inner chamber is formed by the addition of the "L"-shaped inner partition; or at least one "L"-shaped outer partition positioned outside the hollow cylinder, such that each "L"-shaped outer partition is adapted to obstruct the flow of gas from the perforated outer wall of the hollow cylinder from going down the outside of the hollow cylinder; whereby an "L"-shaped outer chamber is formed by the addition of the "L"-shaped outer partition;
   (g) whereby as the circulating means circulates gas through the housing, the "L"-shaped inner partitions and or "L"-shaped outer partitions will direct the flow of gas through the stack of conveyor belt tiers.

8. The apparatus of claim 7, further comprising means for influencing at least one parameter of the gas flow through the conveyor stack in or downstream from the "L"-shaped inner chamber, or in or downstream from the "L"-shaped outer chamber.

9. The apparatus of claim 8, wherein the influencing means are ejectors, influencing at least one of the gas parameters selected from the group consisting of temperature, pressure, velocity, humidity, or any combination of these.

10. The apparatus of claim 8, wherein the influencing means are vents.

11. The apparatus of claim 8, further comprising at least one inlet pipe extending through any of the first partition, the inner partition, the outer partition, or the housing.

* * * * *